(12) United States Patent
Matsuda

(10) Patent No.: US 11,774,973 B2
(45) Date of Patent: Oct. 3, 2023

(54) STORAGE DEVICE, MOVEMENT ASSISTANCE SYSTEM, AND MOVEMENT ASSISTANCE METHOD

(71) Applicant: KAWASAKI MOTORS, LTD., Akashi (JP)

(72) Inventor: Yoshimoto Matsuda, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 254 days.

(21) Appl. No.: 16/822,887

(22) Filed: Mar. 18, 2020

(65) Prior Publication Data
US 2020/0341475 A1    Oct. 29, 2020

(30) Foreign Application Priority Data
Apr. 23, 2019   (JP) .................................. 2019-081757

(51) Int. Cl.
*G05D 1/02*   (2020.01)
*G05D 1/10*   (2006.01)
(Continued)

(52) U.S. Cl.
CPC .............. *G05D 1/0214* (2013.01); *B60P 3/11* (2013.01); *B64C 39/024* (2013.01); *G01C 21/20* (2013.01);
(Continued)

(58) Field of Classification Search
CPC .................................................... G05D 1/0214
See application file for complete search history.

(56) References Cited

U.S. PATENT DOCUMENTS 9,323,250 B2 *   4/2016   Wang .................... G05D 1/0259
9,429,953 B1 *   8/2016   Miller ..................... G01S 19/01
(Continued)

FOREIGN PATENT DOCUMENTS

CN   111857145 A  * 10/2020
EP     3273201 A1    1/2018
(Continued)

OTHER PUBLICATIONS

Machine Traslation of Korean patent Pub. 10-2015-0104484.*
(Continued)

*Primary Examiner* — Jean Paul Cass
(74) *Attorney, Agent, or Firm* — Alleman Hall Creasman & Tuttle LLP

(57) ABSTRACT

Provided is a storage device storing a movement assistance program, the program being configured to cause a computer to implement the functions of: a terrain information acquisition instruction section that instructs a terrain information acquisition device mounted on a flying machine to acquire terrain information representing a terrain lying between a present location of a ground-moving machine and a destination; a zone classification section that makes a classification based on a predetermined movement permission condition and the terrain information to divide the terrain lying between the present location and the destination into a movement-permitted zone and a movement-prohibited zone; and an output section that outputs at least one selected from a movement route of the ground-moving machine, the movement-permitted zone, and the movement-prohibited zone, the movement route leading from the present location to the destination without passing through the movement-prohibited zone.

12 Claims, 9 Drawing Sheets

(51) Int. Cl.
*B60P 3/11* (2006.01)
*B64C 39/02* (2023.01)
*G01C 21/20* (2006.01)

(52) U.S. Cl.
CPC ......... *G05D 1/106* (2019.05); *B64U 2201/10* (2023.01); *G05D 2201/0213* (2013.01)

(56) References Cited

U.S. PATENT DOCUMENTS

| | | | |
|---|---|---|---|
| 9,718,564 B1* | 8/2017 | Beckman | B61L 23/00 |
| 10,165,722 B2* | 1/2019 | Ackerman | G05D 1/024 |
| 10,301,017 B2* | 5/2019 | del Castillo | B64C 11/28 |
| 10,787,258 B2* | 9/2020 | Apostolopoulos | G08G 5/0026 |
| 10,987,184 B2* | 4/2021 | Di Benedetto | A61B 50/30 |
| 11,053,021 B2* | 7/2021 | Di Benedetto | B64U 10/13 |
| 11,127,305 B2* | 9/2021 | Di Benedetto | G06Q 50/30 |
| 11,181,933 B2* | 11/2021 | Di Benedetto | B64U 50/19 |
| 2005/0195096 A1 | 9/2005 | Ward et al. | |
| 2016/0016663 A1* | 1/2016 | Stanek | G05D 1/0202 701/3 |
| 2018/0032071 A1* | 2/2018 | Wieneke | G05D 1/0038 |
| 2018/0079272 A1* | 3/2018 | Aikin | B60G 17/0195 |
| 2019/0025828 A1 | 1/2019 | Kuhara | |
| 2019/0049968 A1* | 2/2019 | Dean | A61G 5/04 |
| 2019/0102623 A1 | 4/2019 | Flood et al. | |
| 2019/0265736 A1 | 8/2019 | Goto et al. | |

FOREIGN PATENT DOCUMENTS

| | | | |
|---|---|---|---|
| EP | 3251108 B1 * | 7/2019 | G01C 21/20 |
| JP | 2010250478 A | 11/2010 | |
| JP | 2017013653 A | 1/2017 | |
| KR | 20150104484 A * | 9/2015 | |
| WO | 2018096760 A1 | 5/2018 | |

OTHER PUBLICATIONS

Kiran, P Sai Ramana et al., "Aerial-Ground Robotic system for Terrain estimation and Navigation," 2019 Fifth Indian Control Conference, Jan. 9, 2019, Delhi, India, 6 pages.

* cited by examiner

STORAGE DEVICE, MOVEMENT ASSISTANCE SYSTEM, AND MOVEMENT ASSISTANCE METHOD

CROSS-REFERENCE TO RELATED APPLICATION

This application claims priority to and the benefit of Japanese Patent Application No. 2019-081757, filed on Apr. 23, 2019, the entire disclosure of which is incorporated herein by reference.

BACKGROUND OF THE INVENTION

Field of the Invention

The present disclosure relates to a storage device storing a movement assistance program for assisting the movement of a moving machine configured to move on ground, and also relates to a movement assistance system and movement assistance method for assisting the movement of a moving machine configured to move on ground.

Description of the Related Art

Japanese Laid-Open Patent Application Publication No. 2010-250478 discloses a driver assistance system that causes a flying unit to fly at a location spaced from a vehicle in a direction in which the vehicle travels. In this driver assistance system, an image of the road on which the vehicle is traveling is captured by imaging means mounted on the flying unit, and information based on the captured image is provided to the occupant of the vehicle. As such, this system can notify the occupant of the presence of an object which may emerge into the travel route to be taken by the vehicle from behind, for example, a parked vehicle.

There is a demand for a movement assistance system for assisting the movement of a machine moving on ground without roads or on ground where, due to a natural disaster or any other cause, a road has been severed or the terrain has been changed from that presented on the latest map, the system being configured to propose to the driver a route free of obstacles up to the destination or control the movement of the machine.

SUMMARY OF THE INVENTION

An objective of the present invention is to provide: a storage device storing a movement assistance program for assisting the movement of a machine moving on ground without designated roads; and a movement assistance system and movement assistance method for assisting the movement of a machine moving on ground without designated roads, the program, system, and method being configured to allow the machine to move along a route free of obstacles up to the destination.

To achieve the objective, a storage device according to one aspect of the present invention stores a movement assistance program executed in a system including a ground-moving machine configured to move on ground and a flying machine in order to assist movement of the ground-moving machine to a specified destination, the program being configured to cause a computer to implement the functions of: a terrain information acquisition instruction section that instructs a terrain information acquisition device mounted on the flying machine to acquire terrain information representing a terrain lying between a present location of the ground-moving machine and the destination; a zone classification section that makes a classification based on a predetermined movement permission condition and the terrain information to divide the terrain lying between the present location and the destination into a movement-permitted zone meeting the movement permission condition and a movement-prohibited zone failing to meet the movement permission condition; and an output section that outputs at least one selected from a movement route of the ground-moving machine, the movement-permitted zone, and the movement-prohibited zone, the movement route leading from the present location to the destination without passing through the movement-prohibited zone.

With the above storage device, the terrain lying between the present location of the ground-moving machine and the destination is divided into a zone meeting the movement permission condition and a zone failing to meet the movement permission condition. Thus, with the movement permission condition predetermined according to the purpose, capacity, etc. of the ground-moving machine, the ground-moving machine can be moved smoothly to the destination while allowing the ground-moving machine to avoid a terrain undesired for movement of the ground-moving machine.

In the storage device, the movement permission condition may include a condition for determining whether movement of the ground-moving machine is permissible in view of the capacity of the ground-moving machine. With this storage device, the ground-moving machine can be moved smoothly to the destination while allowing the ground-moving machine to avoid a terrain on which the ground-moving machine is not movable because of lack of capacity.

In the storage device, the zone classification section may estimate the degree of elevation change at different sites on the terrain represented by the terrain information, and the movement permission condition may include a condition for determining whether the estimated degree of elevation change is within a specified range. With this storage device, a determination can be made regarding whether the estimated degree of elevation change is within a range over which movement of the ground-moving machine is permissible.

In the storage device, the output section may, based on a result of the classification by the zone classification section, determine and output the movement route leading to the destination without passing through the movement-prohibited zone, and the program may cause the computer to further implement the function of a movement control section that controls movement of the ground-moving machine based on the output movement route. With this storage device, the ground-moving machine can be moved to the destination while allowing the ground-moving machine to automatically avoid the movement-prohibited zone.

In the storage device, the output section may cause a display device to display a synthetic image in which at least one selected from the movement route leading to the destination without passing through the movement-prohibited zone, the movement-permitted zone, and the movement-prohibited zone is superimposed on a ground image representing ground lying between the present location and the destination. With this storage device, information useful for moving the ground-moving machine to the destination can be presented to an operator remotely controlling the ground-moving machine or an occupant such as a driver on board the ground-moving machine.

In the storage device, the flying machine may include a propulsion force generation device and an energy source for the propulsion force generation device, and the program may cause the computer to further implement the functions of: a flight control section that controls flight of the flying machine such that the flying machine flies at least between the present location of the ground-moving machine and the specified destination; a residual energy monitoring section that monitors a residual energy of the energy source; an energy estimation section that estimates the amount of energy required for the flying machine to fly through a predetermined flight route between a specified takeoff-landing site for the flying machine and the destination; and a flight prohibition section that prohibits the flying machine from flying from the takeoff-landing site toward the destination when the estimated amount of energy is more than the residual energy. With this storage device, it is possible to reduce the occurrence of a situation where the flying machine having departed for the destination runs out of energy during flight and becomes unable to return.

In the storage device, the estimated amount of energy may be a value obtained by adding the amount of takeoff-landing energy required for takeoff and landing of the flying machine to the amount of flight energy required for flight along the flight route and calculated from a distance of the flight along the flight route. With this storage device, since the energy estimation section takes into consideration the energy required for takeoff and landing of the flying machine in estimating the amount of energy required for outward and return flights between the takeoff-landing site and the destination, the energy requirement estimation can be achieved with an improved accuracy.

In the storage device, the movement assistance program may cause the computer to further implement the functions of: an energy consumption monitoring section that monitors an energy consumption which is the amount of energy consumed by the flying machine from when the flying machine departs from the takeoff-landing site until the flying machine reaches a point on the flight route toward the destination; and a return decision section that decides, based on the energy consumption and the residual energy, whether to cause the flying machine to return to the takeoff-landing site. With this storage device, when the flying machine having departed from the takeoff-landing site is flying toward the destination, the return decision section decides to cause the flying machine to return if the actual energy consumption is more than the amount of energy estimated by the energy estimation section. This can further reduce the occurrence of the situation where the flying machine having departed for the destination runs out of energy during flight and becomes unable to return.

In the storage device, a takeoff-landing platform serving as the takeoff-landing site for the flying machine may be provided in the ground-moving machine or an installation other than the ground-moving machine. With the configuration in which the ground-moving machine includes the takeoff-landing platform for the flying machine, the need for additionally providing a takeoff-landing platform for the flying machine is eliminated, and the amount of energy of the flying machine can be saved by causing the ground-moving machine to move with the flying machine landed thereon. With the configuration in which the ground-moving machine does not include the takeoff-landing platform for the flying machine, the ground-moving machine need not have a structure required to enable takeoff and landing of the flying machine, and thus size increase of the ground-moving machine can be prevented.

The storage device is a readable and writable device or a readable device built in or externally connected to a computer. The storage device may be, for example, a hard disk, a flash memory, or an optical disk. The program stored in the storage device may be executed by a computer to which the storage device is directly connected or may be downloaded and executed by a computer connected to the storage device via a network (e.g., the Internet).

A movement assistance system according to one aspect of the present invention includes a ground-moving machine configured to move on ground and a flying machine, the movement assistance system being configured to assist movement of the ground-moving machine to a specified destination, wherein the flying machine includes a terrain information acquisition device and a terrain information acquisition instruction section that instructs the terrain information acquisition device to acquire terrain information representing a terrain lying between a present location of the ground-moving machine and the destination, the ground-moving machine or the flying machine includes a zone classification section that makes a classification based on a predetermined movement permission condition and the terrain information to divide the terrain lying between the present location and the destination into a movement-permitted zone meeting the movement permission condition and a movement-prohibited zone failing to meet the movement permission condition, and the ground-moving machine includes an output section that outputs at least one selected from a movement route of the ground-moving machine, the movement-permitted zone, and the movement-prohibited zone, the movement route leading from the present location to the destination without passing through the movement-prohibited zone. With the movement assistance system, the terrain lying between the present location of the ground-moving machine and the destination is divided into a zone meeting the movement permission condition and a zone failing to meet the movement permission condition. Thus, with the movement permission condition predetermined according to the purpose or capacity of the ground-moving machine, the ground-moving machine can be moved smoothly to the destination while allowing the ground-moving machine to avoid a terrain undesired for movement of the ground-moving machine.

A movement assistance method according to one aspect of the present invention is a movement assistance method executed in a system including a ground-moving machine configured to move on ground and a flying machine in order to assist movement of the ground-moving machine to a specified destination, the method including: instructing a terrain information acquisition device mounted on the flying machine to acquire terrain information representing a terrain lying between a present location of the ground-moving machine and the destination; making a classification based on a predetermined movement permission condition and the terrain information to divide the terrain lying between the present location and the destination into a movement-permitted zone meeting the movement permission condition and a movement-prohibited zone failing to meet the movement permission condition; and outputting at least one selected from a movement route of the ground-moving machine, the movement-permitted zone, and the movement-prohibited zone, the movement route leading from the present location to the destination without passing through the movement-prohibited zone. With the movement assistance method, the terrain lying between the present location of the ground-moving machine and the destination is divided into a zone meeting the movement permission condition and a zone failing to meet the movement permission condition. Thus, with the movement permission condition predetermined according to the purpose or capacity of the ground-moving machine, the ground-moving machine can be moved smoothly to the destination while allowing the ground-moving machine to avoid a terrain undesired for movement of the ground-moving machine.

The above and further objects, features and advantages of the present disclosure will be more apparent from the following detailed description of preferred embodiments with reference to the accompanying drawings.

DETAILED DESCRIPTION OF THE EMBODIMENTS

Hereinafter, embodiments will be described with reference to the drawings.

Embodiment 1

Figure 1:
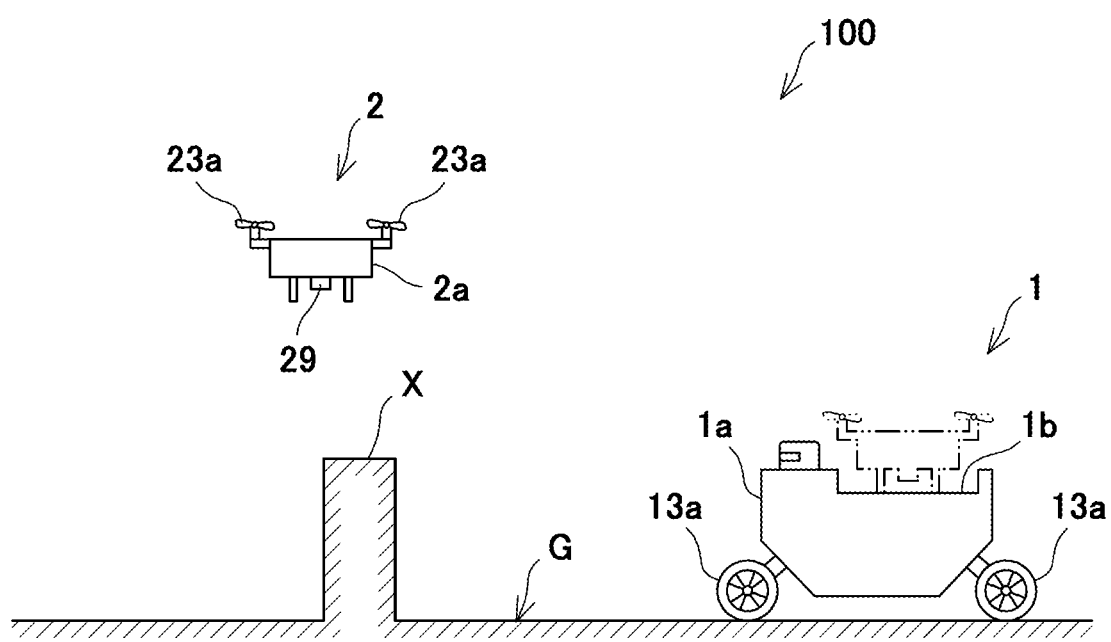
FIG. 1 is a schematic configuration diagram of a movement assistance system according to Embodiment 1.

FIG. 1 is a configuration diagram of a movement assistance system 100 according to Embodiment 1. The movement assistance system 100 includes a moving machine 1 configured to move on ground (this machine will be referred to as "ground-moving machine") and a flying machine 2. The movement assistance system 100 is a system for assisting the movement of the ground-moving machine 1 to a specified destination on ground G without designated roads. For example, the movement assistance system 100 sets a movement route leading to the destination and avoiding an obstacle X existing on the ground G without designated roads, and assists the movement of the ground-moving machine 1 to allow the ground-moving machine 1 to take the set movement route.

In the specification and claims of the present application, the "ground without designated roads", on which the ground-moving machine 1 moves, includes not only areas such as wildlands which are intrinsically devoid of roads but also disaster sites. That is, the "ground without designated roads" includes an area where there are designated roads but where, due to a disaster or any other cause, obstacles such as debris of concrete or wood have been generated or the roads have lost their function.

In the present embodiment, an unmanned, self-driving vehicle is described as an example of the ground-moving machine 1. The ground-moving machine 1 includes a main body 1a, which is provided with a port 1b serving as a takeoff-landing platform for the flying machine 2. An example of the flying machine 2 is a drone.

Hardware Configuration

Figure 2:
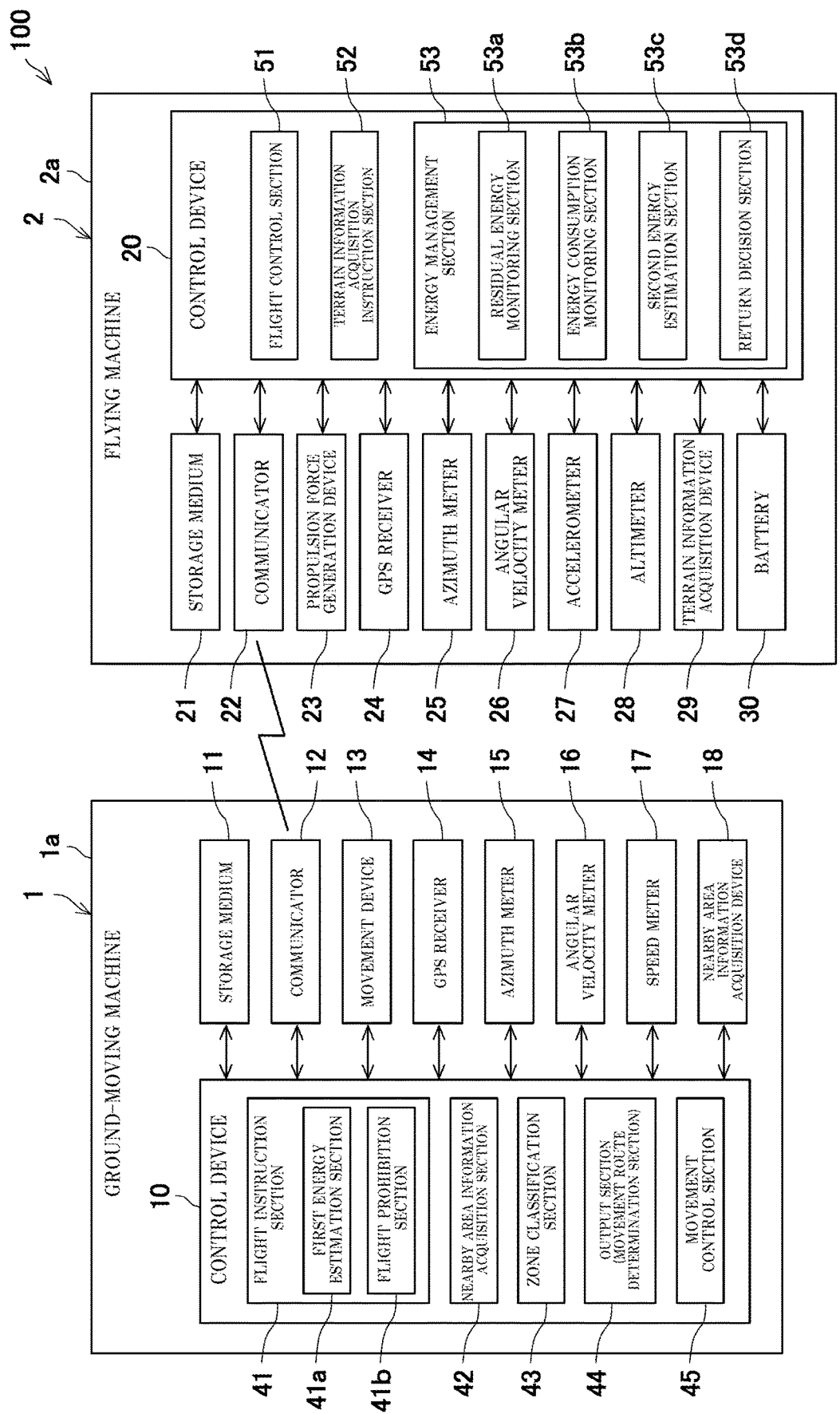
FIG. 2 is a block diagram showing the respective configurations of a ground-moving machine and a flying machine which are shown in FIG. 1.

FIG. 2 is a block diagram showing the respective configurations of the ground-moving machine 1 and flying machine 2 of the movement assistance system 100.

Hardware Configuration of Ground-Moving Machine

The hardware configuration of the ground-moving machine 1 will be described first. The main body 1a of the ground-moving machine 1 is equipped with a control device 10, a storage medium 11, a communicator 12, a movement device 13, a GPS receiver 14, an azimuth meter 15, an angular velocity meter 16, a speed meter 17, and a nearby area information acquisition device 18. The elements 10 to 18 are connected together to enable data transfer therebetween.

The control device 10 executes various programs. The control device 10 is, for example, a computer including a central processing unit (CPU). The storage medium 11 stores various programs and data. The storage medium 11 is, for example, a non-volatile memory such as a hard disk or ROM or a volatile memory such as a RAM. The storage medium 11 stores a part of the movement assistance program of the present embodiment.

The communicator 12 is a transmitter-receiver that transmits and receives signals and information to and from a communicator 22 included in the flying machine 2.

The movement device 13 is a device for movement of the ground-moving machine 1. In the present embodiment, the movement device 13 includes a plurality of wheels 13a in contact with the ground (see FIG. 1), a prime mover configured to rotate the wheels 13a, and a steering mechanism configured to change the orientations of the wheels 13a. The movement device 13 is controlled by the control device 10.

The GPS receiver 14 receives a GPS signal from a GPS satellite and outputs location information indicating the present location of the ground-moving machine 1 on the ground coordinate system.

The azimuth meter 15 is a magnetic azimuth meter that acquires the orientation of the ground-moving machine 1 on the ground coordinate system.

The angular velocity meter 16 detects the angular velocity of the ground-moving machine 1. The angular velocity meter 16 is, for example, a gyroscope that detects angular velocities in three axial directions defined with respect to the main body 1a of the ground-moving machine 1.

The speed meter 17 detects the speed of the main body 1a of the ground-moving machine 1 in the forward/rearward direction. The speed acquired by the speed meter 17 is used, for example, to estimate the time of arrival at the destination.

The nearby area information acquisition device 18 acquires information related to a nearby area of the ground-moving machine 1. Specifically, the nearby area information acquisition device 18 detects objects such as the obstacle X which exist in the nearby area of the ground-moving machine 1. For example, an infrared laser radar, a millimeter-wave radar, an ultrasonic sensor, or a camera can be used as the nearby area information acquisition device 18.

Hardware Configuration of Flying Machine

Next, the hardware configuration of the flying machine 2 will be described. The flying machine 2 includes a main body 2a, which is equipped with a control device 20, a storage medium 21, a communicator 22, a propulsion force generation device 23, a GPS receiver 24, an azimuth meter 25, an angular velocity meter 26, an accelerometer 27, an altimeter 28, a terrain information acquisition device 29, and a battery 30. The elements 20 to 30 are connected together to enable data transfer therebetween.

The control device 20 executes various programs. The control device 20 is, for example, a computer including a central processing unit (CPU). The storage medium 21 stores various programs and data. The storage medium 21 is, for example, a non-volatile memory such as a hard disk or ROM or a volatile memory such as a RAM. The storage medium 21 stores a part of the movement assistance program of the present embodiment.

The communicator 22 is a transmitter-receiver that transmits and receives signals and information to and from the communicator 12 included in the ground-moving machine 1.

The propulsion force generation device 23 includes a plurality of rotary blades 23a (see FIG. 1) and a prime mover configured to rotationally drive the rotary blades 23a. The propulsion force generation device 23 may include stationary blades instead of the rotary blades 23a.

The GPS receiver 24 receives a GPS signal from a GPS satellite and outputs location information indicating the present location of the flying machine 2 on the ground coordinate system.

The azimuth meter 25 is a magnetic azimuth meter that acquires the orientation of the flying machine 2 on the ground coordinate system.

The angular velocity meter 26 detects the angular velocity of the flying machine 2. The angular velocity meter 16 is, for example, a gyroscope that detects angular velocities in three axial directions defined with respect to the main body 2a of the flying machine 2.

The accelerometer 27 detects the acceleration of the flying machine 2. For example, the accelerometer 27 detects accelerations in three axial directions defined with respect to the main body 2a of the flying machine 2.

The altimeter 28 detects the altitude of the flying machine 2. The altimeter 28 is, for example, a barometric altimeter that measures the barometric pressure and converts the measured pressure to the altitude.

The terrain information acquisition device 29 is a device that acquires information (terrain information) related to a terrain surrounding the ground-moving machine 1, in particular a terrain lying between the present location of the ground-moving machine 1 and the destination. In the present specification, the "terrain information" includes not only information related to the shapes and states of natural objects, such as the presence of a rocky area, the presence of a valley, the presence of mud on the ground surface, the presence of cracks, the slope of the ground surface, and the roughness of the ground surface, but also information related to the shapes and states of artificial objects. That is, the "terrain" includes artificial constructions, cracks and holes in concrete surfaces, and debris generated due to a disaster or any other cause.

For example, the terrain information acquisition device 29 is an optical distance meter that detects the distance from the flying machine 2 to the terrain. For example, a device including either a radar device (such as an infrared radar or a millimeter-wave radar) or a camera or both can be used as the terrain information acquisition device 29. The details of the acquisition of the terrain information by the terrain information acquisition device 29 will be described later.

The battery 30 is an energy source for the propulsion force generation device 23 and supplies electric power to the propulsion force generation device 23. In the case where the propulsion force generation device 23 is a device operated with liquid fuel, a liquid fuel tank is mounted on the main body 2a of the flying machine 2 instead of the battery 30.

Functional Configuration

Next, the functional configuration of the control device 10 of the ground-moving machine 1 and the functional configuration of the control device 20 of the flying machine 2 will be described. The control device 10 of the ground-moving machine 1 includes a flight instruction section 41, a nearby area information acquisition section 42, a zone classification section 43, an output section 44, and a movement control section 45 as functional elements. The control device 20 of the flying machine 2 includes a flight control section 51, a terrain information acquisition instruction section 52, and an energy management section 53 as functional elements.

The movement assistance program of the present embodiment includes different processing programs stored separately in the storage medium 11 of the ground-moving machine 1 and the storage medium 21 of the flying machine 2. The control device 10 executes the processing program stored in the storage medium 11 as a part of the movement assistance program, thereby implementing the functions of the functional sections 41 to 45, while the control device 20 executes the processing program stored in the storage medium 21 as a part of the movement assistance program, thereby implementing the functions of the functional sections 51 to 53.

Functional Configuration of Control Device of Ground-Moving Machine

The flight instruction section 41 controls the communicator 12 to send a flight instruction to the flying machine 2. The flight instruction contains flight route information which is information related to the flight route of the flying machine 2.

In the present embodiment, the flight instruction section 41 determines the flight route of the flying machine 2 according to the present location of the ground-moving machine 1 and the destination. For example, the flight instruction section 41 determines, as the flight route along which the flying machine 2 makes outward and return flights, a route corresponding to a straight line drawn between the present location and the destination in a plan view of the ground. This is not the only way to determine the flight route. For example, the flight route for an outward flight from the present location to the destination and the flight route for a return flight from the destination to the present location may be different. The flight instruction section 41 may determine, as the flight route for an outward flight to the destination, a route meandering between the present location and the destination in a plan view of the ground. The flight route need not be determined by the flight instruction section 41, and the flight route information may be determined by a different remote device or by the control device 20 of the flying machine 2 and received through the communicator 12.

The nearby area information acquisition section 42 acquires the nearby area information from the nearby area information acquisition device 18. The nearby area information is used to detect obstacles during movement of the ground-moving machine 1.

The zone classification section 43 makes a classification based on a predetermined movement permission condition and the terrain information received from the flying machine 2 to divide the terrain lying between the present location of the ground-moving machine 1 and the destination into a movement-permitted zone meeting the movement permission condition and a movement-prohibited zone failing to meet the movement permission condition.

The movement permission condition is predetermined by the user or any other entity, and information related to the movement permission condition is stored in the storage medium 11. The information related to the movement permission condition may be received from a different remote device through the communicator 12 and stored in the storage medium 11. In the case where an input device that receives inputs from the user is mounted on the ground-moving machine 1, the information related to the movement permission condition may be input by the user through the input device and stored in the storage medium 11.

The movement permission condition includes one or more conditions such as a condition appropriate for the purpose of the movement of the ground-moving machine 1 and a condition desired by the user. For example, when the ground-moving machine 1 is used to deliver to the destination a fragile item which may be broken by vibration or impact, the user can set, as the movement permission condition, a condition that the ground surface does not have a roughness equal to or greater than a certain level. For example, when the user wants to move the ground-moving machine 1 to the destination while avoiding mud on the ground surface, the user can set a condition that no mud exists on the ground surface as the movement permission condition. Naturally, settable movement permission conditions are limited to those based on which the zone classification section 43 can make a classification with reference to the terrain information. For example, the condition that no mud exists on the ground surface may be set as the movement permission condition only when the zone classification section 43 can identify mud on the ground surface from the terrain information.

The movement permission condition includes a condition for determining whether the movement of the ground-moving machine 1 is permissible in view of the capacity of the ground-moving machine 1. For example, elevated portions that the movement device 13 of the ground-moving machine 1 can cross or climb are limited to those where the degree of elevation change is within a range specified depending on the capacity of the movement device 13. Thus, for example, the movement permission condition includes a condition for determining whether the degree of elevation change is within a specified range at different sites on the terrain represented by the terrain information. In this case, the zone classification section 43 estimates the degree of elevation change at different sites on the terrain represented by the terrain information and classifies a site where the estimated degree of elevation change falls outside the specified range as the movement-prohibited zone.

The output section 44 outputs at least one selected from a movement route of the ground-moving machine 1, the movement-permitted zone, and the movement-prohibited zone, the movement route leading from the present location to the destination without passing through the movement-prohibited zone. In the present embodiment, the output section 44 determines, based on the result of the classification by the zone classification section 43, the movement route of the ground-moving machine 1 which leads to the destination without passing through the movement-prohibited zone, and the output section 44 outputs the determined movement route to the movement control section 45. That is, in the present embodiment, the output section 44 functions also as a movement route determination section.

The movement control section 45 controls the movement device 13 based on the movement route output by the output section 44 to cause the ground-moving machine 1 to move along the movement route. More specifically, the movement control section 45 acquires from the GPS receiver 14 the present location information indicating the present location of the ground-moving machine 1 on the ground coordinate system, and acquires from the azimuth meter 15 the orientation information indicating the orientation of the ground-moving machine 1 on the ground coordinate system. The movement control section 45 controls the movement device 13 to allow the ground-moving machine 1 to take the movement route while monitoring the present location information and the orientation information.

The flight instruction section 41 described above includes a first energy estimation section 41*a* and a flight prohibition section 41*b*. The first energy estimation section 41*a* estimates the amount of energy required for the flying machine 2 to fly through a predetermined flight route (in the present embodiment, the flight route determined by the flight instruction section 41) between the destination and the port 1*b* provided in the ground-moving machine 1 as a takeoff-landing site for the flying machine 2. The estimated amount of energy is a value obtained by adding the amount of takeoff-landing energy required for takeoff and landing of the flying machine 2 to the amount of flight energy required for flight along the flight route and calculated from a distance of the flight along the flight route. The details of how the first energy estimation section 41*a* estimates the energy requirement will be described later.

The flight prohibition section 41*b* prohibits the flying machine 2 from flying from the port 1*b* of the ground-moving machine 1 toward the destination when the amount of energy estimated by the first energy estimation section 41*a* is more than the residual energy of the battery 30 of the flying machine 2. That is, when the estimated amount of energy is more than the residual energy of the battery 30, the flight instruction is not sent to the flying machine 2.

Functional Configuration of Control Device of Flying Machine

The flight control section 51 controls the flight of the flying machine 2 such that the flying machine 2 flies at least between the present location of the ground-moving machine 1 and a specified destination.

The terrain information acquisition instruction section 52 instructs the terrain information acquisition device 29 mounted on the flying machine 2 to acquire the terrain information representing the terrain lying between the present location of the ground-moving machine 1 and the destination.

The energy management section 53 manages the amount of energy of the battery 30 serving as an energy source for the propulsion force generation device 23. The energy management section 53 includes a residual energy monitoring section 53*a*, an energy consumption monitoring section 53*b*, a second energy estimation section 53*c*, and a return decision section 53*d*.

The residual energy monitoring section 53*a* monitors the residual energy of the battery 30.

The energy consumption monitoring section 53*b* monitors an energy consumption which is the amount of energy consumed by the flying machine 2 from when the flying machine 2 departs from the ground-moving machine 1 serving as the takeoff-landing site until the flying machine 2 reaches a point on the flight route toward the destination.

The way of monitoring the energy consumption is not limited to a particular one. For example, the flying machine 2 may be equipped with a current sensor that detects the level of the current discharged from the battery 30. In this case, the energy consumption monitoring section 53b may, based on the current value acquired from the current sensor, calculate the consumed electric power as the energy consumption. For example, in the case where the flying machine 2 is equipped with a liquid fuel tank in place of the battery 30 and the propulsion force generation device 23 includes a fuel injector, the energy consumption monitoring section 53b may calculate the amount of consumed liquid fuel as the energy consumption based on the amount and period of injection by the fuel injector.

Based on the energy consumption monitored by the energy consumption monitoring section 53b, the second energy estimation section 53c estimates the amount of energy required for the flying machine 2 to fly through the rest of the flight route. The details of how the second energy estimation section 53c estimates the energy requirement will be described later.

The return decision section 53d decides whether to cause the flying machine 2 to return to the takeoff-landing site based on the energy consumption monitored by the energy consumption monitoring section 53b and the residual energy monitored by the residual energy monitoring section 53a. More specifically, the return decision section 53d makes a comparison between the energy requirement estimated by the second energy estimation section 53c based on the energy consumption and the residual energy monitored by the residual energy monitoring section 53a and, when the energy requirement is more than the residual energy, the return decision section 53d decides to cause the flying machine 2 to return to the ground-moving machine 1. Even when the value obtained by subtracting the energy requirement from the residual energy is a positive value, the return decision section 53d may decide to cause the flying machine 2 to return to the ground-moving machine 1 if the positive value is smaller than a predetermined threshold.

Movement Assistance Process

Figure 3:
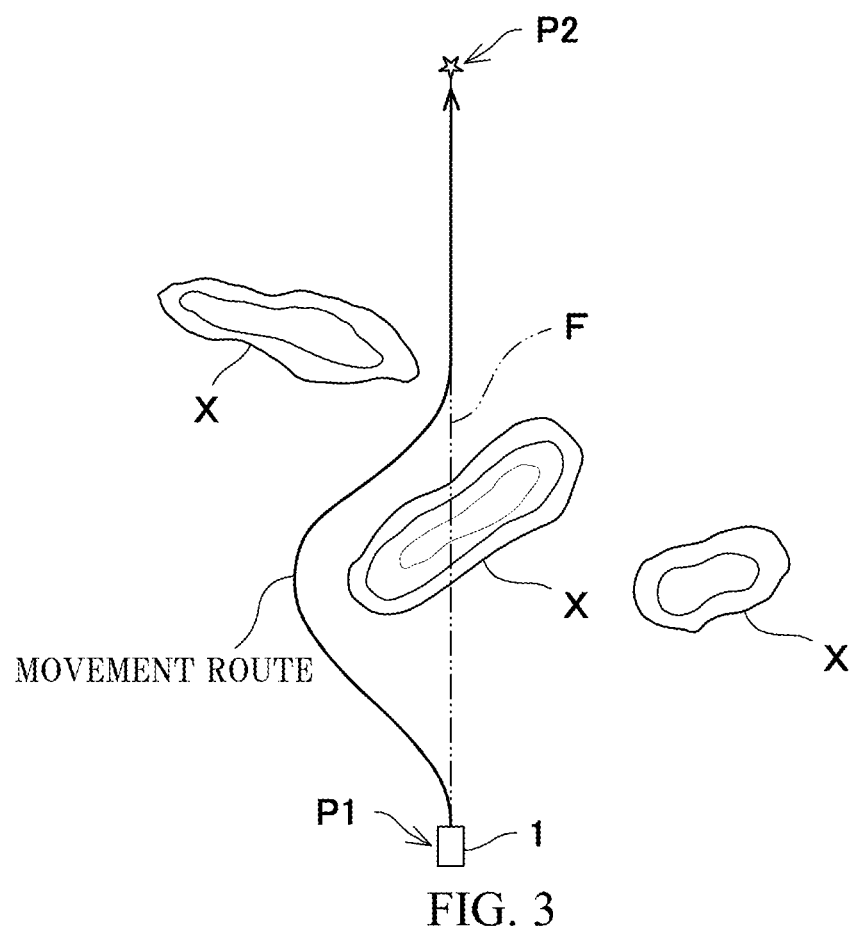
FIG. 3 is a schematic plan view of an example of a terrain lying between a present location of the ground-moving machine shown in FIG. 1 and a destination.

The following describes a movement assistance process performed by execution of the movement assistance program in the movement assistance system 100. FIG. 3 is a schematic plan view of an example of a terrain lying between a present location P1 of the ground-moving machine 1 and a destination P2. On the terrain depicted in FIG. 3 there are obstacles X between the present location P1 and the destination P2. Hereinafter, a process for assisting the movement of the ground-moving machine 1, which is situated at the present location P1 in FIG. 3, to the destination P2 of FIG. 3 will be described as an example of the movement assistance process with reference to FIG. 4.

Figure 4:
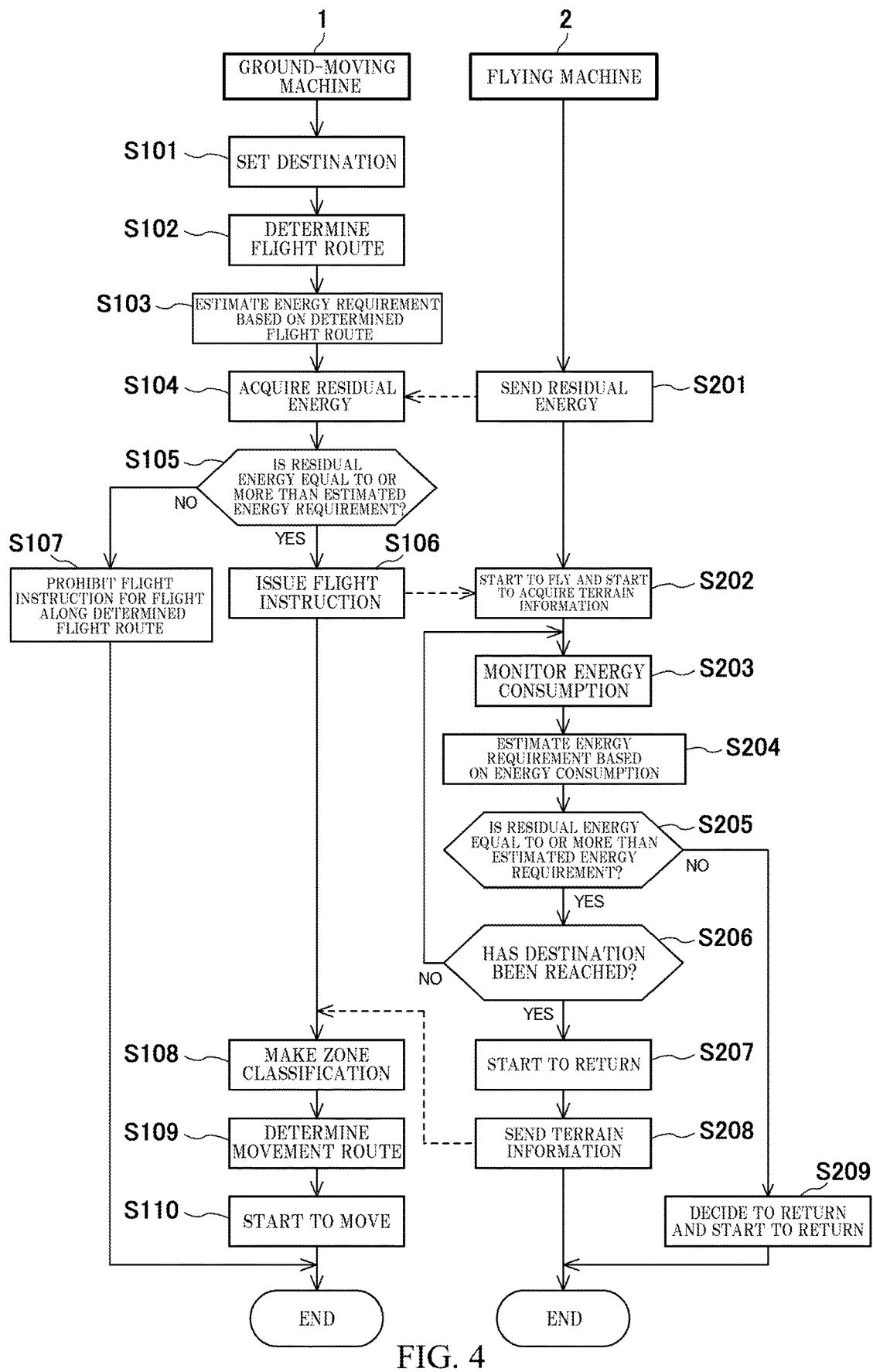
FIG. 4 is a flowchart showing the flow of a movement assistance process.

In the movement assistance process, first, the destination P2 is set in the control device 10 as shown in FIG. 4 (step S101). The information related to the destination P2 may be sent to the control device 10 from a different remote device through the communicator 12. Alternatively, for example, the user managing the ground-moving machine 1 may input the information through a given input device mounted on the ground-moving machine 1.

Next, the flight instruction section 41 determines the flight route of the flying machine 2 based on location information indicating the present location P1 of the ground-moving machine 1 and location information indicating the destination P2 (step S102). Specifically, the flight instruction section 41 determines, as the flight route F (see FIG. 3), a route corresponding to a straight line drawn between the present location P1 and the destination P2 in a plan view of the ground.

Once the flight route F is determined, the first energy estimation section 41a estimates the energy requirement which is the amount of energy required for the flying machine 2 to fly through the determined flight route F (step S103).

Figure 5A:
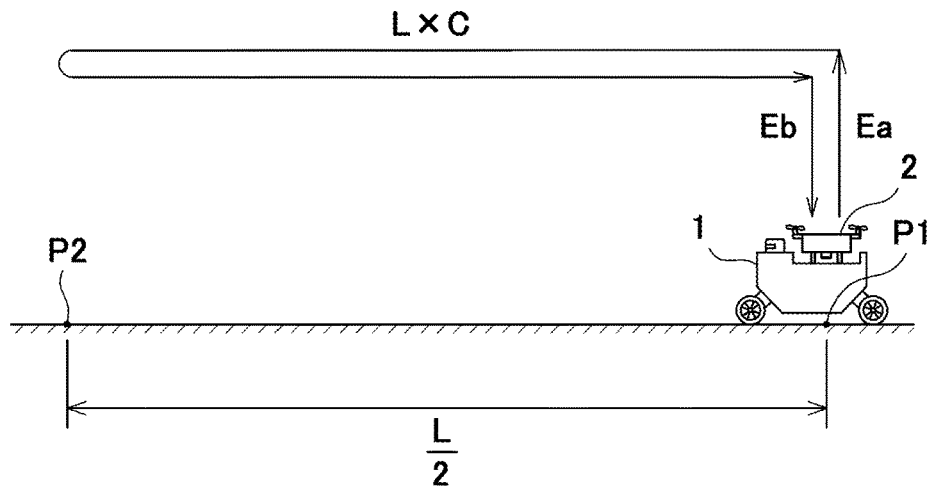
FIG. 5A is a schematic diagram for illustrating an example of how a first energy estimation section performs energy estimation.

An example of how the first energy estimation section 41a estimates the energy requirement will now be described with reference to FIG. 5A. The storage medium 11 has stored therein the amount of energy (hereinafter referred to as "takeoff energy requirement") Ea (Wh) required for the flying machine 2 to take off from the ground-moving machine 1 and ascend to a specified altitude and the amount of energy (hereinafter referred to as "landing energy requirement") Eb (Wh) required for the flying machine 2 to descend from the specified altitude and land on the ground-moving machine 1. The storage medium 11 has stored therein an energy requirement C (Wh/m) per unit flight distance in a substantially horizontal direction. The first energy estimation section 41a uses the values Ea, Eb, and C together with the overall length L of the flight route F (in the present embodiment, the length L is twice the distance between the present location P1 and the destination P2) to calculate the total amount of energy E0 required for the flying machine 2 to fly through the flight route F (the total amount of energy E0 includes the amounts of energy required for takeoff and landing) according to the following equation (1).

$$E0 = Ea + L \times C + Eb \tag{1}$$

Referring back to FIG. 4, the flight instruction section 41 acquires the residual energy of the battery 30 (step S104). Specifically, the flight instruction section 41 controls the communicator 12 to send a residual energy request to the communicator 22 of the flying machine 2. Once the residual energy request is received through the communicator 22, the energy management section 53 controls the communicator 22 to send residual energy information indicating the present residual energy of the battery 30 to the communicator 12 of the ground-moving machine 1 (step S201).

Next, the flight instruction section 41 determines whether the residual energy of the battery 30 of the flying machine 2 is equal to or more than the energy requirement estimated by the first energy estimation section 41a (step S105). When the residual energy is determined to be equal to or more than the energy requirement (step S105: YES), the flight instruction section 41 controls the communicator 12 to send a flight instruction to the communicator 22 of the flying machine 2 (step S106).

When the residual energy is determined to be less than the energy requirement, namely when the energy requirement is more than the residual energy (step S105: NO), the flight prohibition section 41b prohibits the flying machine 2 from flying from the port 1b of the ground-moving machine 1 toward the destination P2 (step S107). That is, the flight instruction section 41 does not send the flight instruction to the flying machine 2.

In the flying machine 2, once the flight instruction is received through the communicator 22, the flight control section 51 brings the propulsion force generation device 23 into operation to start flight control of the flying machine 2. The terrain information acquisition instruction section 52 instructs the terrain information acquisition device 29 mounted on the flying machine 2 to acquire terrain information (step S202).

Upon start of the flight of the flying machine 2, the energy consumption monitoring section 53b begins to monitor the energy consumption (step S203). Based on the monitored energy consumption, the second energy estimation section 53c estimates the minimum energy requirement for the flying machine 2 to fly through the rest of the flight route F (step S204).

Figure 5B:
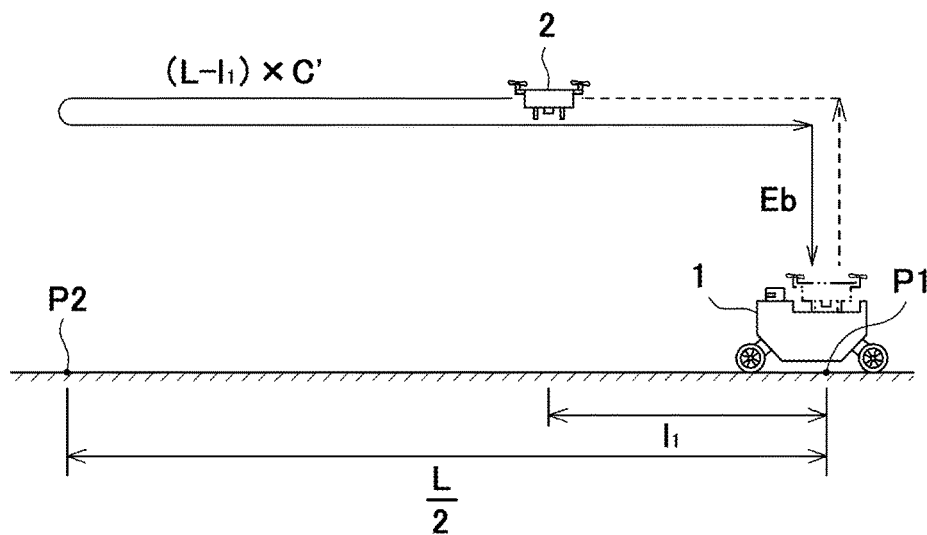
FIG. 5B is a schematic diagram for illustrating an example of how a second energy estimation section performs energy estimation.

An example of how the second energy estimation section 53c estimates the energy requirement will now be described with reference to FIG. 5B. FIG. 5B schematically shows a situation where the flying machine 2 is flying toward the destination P2 after takeoff from the ground-moving machine 1. The storage medium 21 has stored therein the amount of energy (landing energy requirement) Eb (Wh) required for the flying machine 2 to descend from a specified altitude and land on the ground-moving machine 1. The storage medium 21 has stored therein location information acquired from the GPS receiver 24 and indicating the pre-takeoff location of the flying machine 2 (in this example, the pre-takeoff location is the present location P1 of the ground-moving machine 1).

The second energy estimation section 53c acquires the present location of the flying machine 2 from the GPS receiver 24 and compares the present location to the pre-takeoff location of the flying machine 2 to calculate a flight distance $l_1$ (m) having been flown by the flying machine 2 in a substantially horizontal direction. Further, the second energy estimation section 53c acquires from the energy consumption monitoring section 53b the amount of energy $e_1$ (Wh) consumed in the flight over the flight distance $l_1$ and divides the value $e_1$ by the value $l_1$ to calculate an energy requirement C' (Wh/m) per unit flight distance in the substantially horizontal direction. The second energy estimation section 53c calculates the total amount of energy E1 (Wh) required for the flying machine 2 to fly through the rest of the flight route F according to the following equation (2).

$$E1 = (L - l_1) \times C' + Eb = (L - l_1) \times e_1 / l_1 + Eb \qquad (2)$$

Referring back to FIG. 4, the return decision section 53d determines whether the residual energy monitored by the residual energy monitoring section 53a is equal to or more than the energy requirement estimated by the second energy estimation section 53c (step S205). That is, in the example of FIG. 5B, the return decision section 53d compares a present residual energy B (Wh) to the total amount of energy E1 (Wh) required for the flying machine 2 to fly through the rest of the flight route F, and determines whether the residual energy B is equal to or more than the energy requirement E1.

When the residual energy is determined to be less than the energy requirement estimated by the second energy estimation section 53c, (step S205: NO), the return decision section 53d decides to cause the flying machine 2 to return to the takeoff-landing site, and the flight control section 51 controls the propulsion force generation device 23 to cause the flying machine 2 to return (step S209).

When the residual energy is determined to be equal to or more than the energy requirement estimated by the second energy estimation section 53c, (step S205: YES), steps S203 to 205 are repeated until the flying machine 2 reaches a halfway point on the flight route F, i.e., a midair point in the vicinity of the destination P2 (step S206: NO). Once the flying machine 2 reaches the halfway point on the flight route (step S206: YES), the flight control section 51 controls the propulsion force generation device 23 to cause the flying machine 2 to return (step S207).

Once the flying machine 2 returns to the ground-moving machine 1, the terrain information and the location information indicating the location where the flying machine 2 was when the terrain information was acquired are sent to the ground-moving machine 1 from the flying machine 2 (step S208). In the ground-moving machine 1, upon receiving the terrain information from the flying machine 2, the zone classification section 43 makes a classification based on the movement permission condition stored in the storage medium 11 and the received terrain information to divide the terrain lying between the present location P1 and the destination P2 into a movement-permitted zone meeting the movement permission condition and a movement-prohibited zone failing to meet the movement permission condition (step S108).

Figure 6:
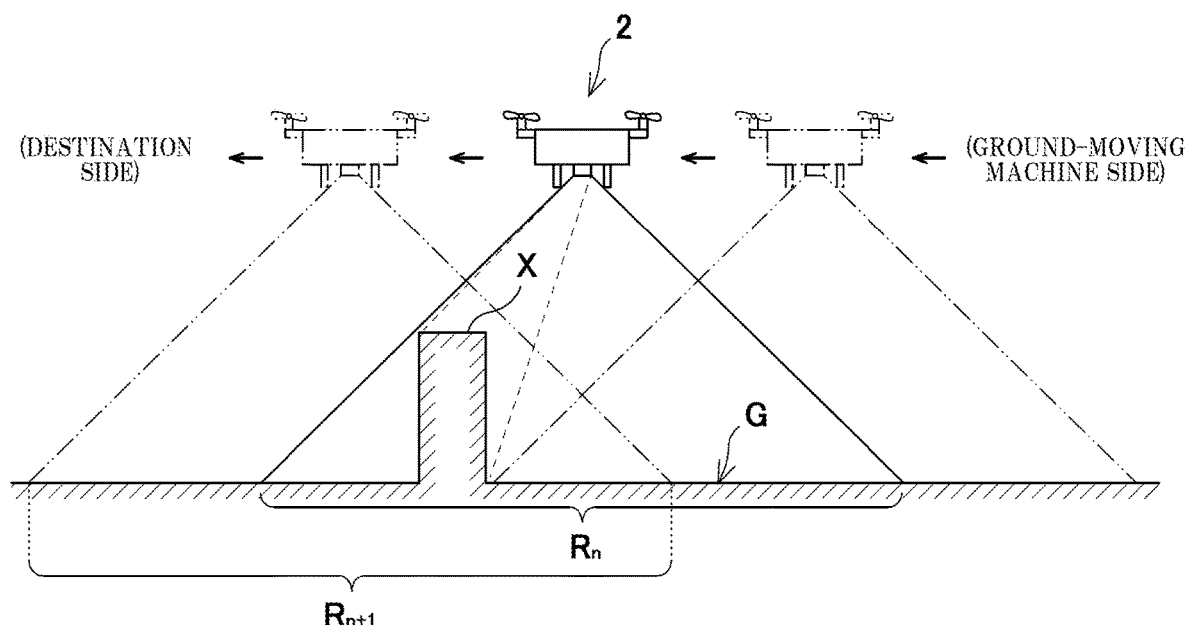
FIG. 6 is a diagram for illustrating an example of how to acquire terrain information.

An example of how to acquire the terrain information will now be described. FIG. 6 is a diagram for illustrating an example of how the terrain information acquisition device 29 acquires the terrain information. During the flight of the flying machine 2 along the flight route F, the terrain information acquisition device 29 acquires the terrain information as to given terrain regions R at regular time intervals or regular flight distance intervals. Each region R is centered at a point at which a straight line drawn vertically downward from the flying machine 2 intersects the ground. The terrain information acquisition device 29 acquires the terrain information in the form of image information or distance information indicating the distance to the flying machine 2, and performs this acquisition such that a terrain region Rn for which the information was acquired at the previous time (e.g., nth acquisition) overlaps a terrain region Rn+1 for which the information will be acquired at the next time (e.g., n+1th acquisition). The different pieces of terrain information thus acquired are stored in the storage medium 21 in association with location information of the flying machine 2 which is acquired from the GPS receiver 24.

In step S208, the different pieces of terrain information obtained as above and the corresponding pieces of location information each of which indicates the location where the flying machine 2 was when the corresponding terrain information was acquired, are sent to the ground-moving machine 1. Based on these pieces of information, the zone classification section 43 recognizes the terrain lying between the present location P1 and destination P2 in three dimensions. When the movement permission condition includes the condition that the degree of elevation change is equal to or less than a predetermined level at the site of concern on the terrain, the zone classification section 43 estimates, based on the terrain information, the degree of elevation change at different sites on the terrain lying between the present location P1 and destination P2, and classifies a site where the estimated degree of elevation change is more than the predetermined level as the movement-prohibited zone.

Referring back to FIG. 4, the output section 44 determines, based on the result of the classification by the zone classification section 43, the movement route of the ground-moving machine 1 which leads to the destination P2 without passing through the movement-prohibited zone, and the output section 44 outputs the determined movement route to the movement control section 45 (step S109; see FIG. 3). The determined movement route is, for example, a movement route which does not pass through the movement-prohibited zone and which is best suited for movement to the destination P2 (e.g., the shortest movement route). Based on the movement route determined by the output section 44, the movement control section 45 controls the movement device 13 to move the ground-moving machine 1 (step S110).

When the ground-moving machine 1 is moving along the movement route, the nearby area information acquisition device 18 acquires the nearby area information. The movement control section 45 causes the ground-moving machine 1 to move while confirming that no obstacles exist on the movement route of the ground-moving machine 1 based on the nearby area information acquired by the nearby area information acquisition section 42.

In the movement assistance system 100 according to the present embodiment, as described above, the terrain lying between the present location P1 of the ground-moving machine 1 and the destination P2 is divided into a zone meeting the movement permission condition and a zone failing to meet the movement permission condition. Thus, with the movement permission condition predetermined according to the purpose or capacity of the ground-moving machine 1, the ground-moving machine 1 can be moved smoothly to the destination P2 while allowing the ground-moving machine 1 to avoid a terrain undesired for movement of the ground-moving machine 1.

In the present embodiment, since the movement permission condition includes a condition for determining whether the movement of the ground-moving machine 1 is permissible in view of the capacity of the ground-moving machine 1, the ground-moving machine 1 can be moved smoothly to the destination P2 while allowing the ground-moving machine 1 to avoid a terrain on which the ground-moving machine 1 is not movable because of lack of capacity.

In the present embodiment, since the zone classification section 43 estimates the degree of elevation change at different sites on the terrain represented by the terrain information and the movement permission condition includes a condition for determining whether the estimated degree of elevation change is within a specified range, a determination can be made regarding whether the estimated degree of elevation change is within a range over which movement of the ground-moving machine 1 is permissible.

In the present embodiment, the output section 44 determines and outputs, based on the result of the classification by the zone classification section 43, the movement route of the ground-moving machine 1 which leads to the destination P2 without passing through the movement-prohibited zone, and the movement control section 45 controls the movement of the ground-moving machine 1 based on the output movement route. As such, the ground-moving machine 1 can be moved to the destination P2 while allowing the ground-moving machine 1 to automatically avoid the movement-prohibited zone.

In the present embodiment, when the amount of energy estimated by the first energy estimation section 41a is more than the residual energy of the battery 30 of the flying machine 2, the flight prohibition section 41b prohibits the flying machine 2 from flying from the port 1b of the ground-moving machine 1 toward the destination. This makes it possible to reduce the occurrence of a situation where the flying machine 2 having departed for the destination P2 runs out of energy during flight and becomes unable to return.

In the present embodiment, the first energy estimation section 41a estimates the amount of energy required for the flying machine 2 to fly through the predetermined flight route by adding the amount of takeoff-landing energy required for takeoff and landing of the flying machine 2 to the amount of flight energy required for flight along the flight route. Since the first energy estimation section 41a takes into consideration the energy required for takeoff and landing of the flying machine 2 in estimating the amount of energy required for outward and return flights between the takeoff-landing site and the destination, the energy requirement estimation can be achieved with an improved accuracy.

In the present embodiment, the return decision section 53d decides whether to cause the flying machine 2 to return to the takeoff-landing site based on the energy consumption monitored by the energy consumption monitoring section 53b and the residual energy monitored by the residual energy monitoring section 53a. Thus, for example, when the flying machine 2 is flying toward the destination P2 after departing from the takeoff-landing site, the return decision section 53d decides to cause the flying machine 2 to return if the actual energy consumption is more than the amount of energy estimated by the first energy estimation section 41a. This can further reduce the occurrence of the situation where the flying machine 2 having departed for the destination P2 runs out of energy during flight and becomes unable to return.

In the present embodiment, since the takeoff-landing platform serving as the takeoff-landing site for the flying machine 2 is provided in the ground-moving machine 1, the need for additionally providing a takeoff-landing platform for the flying machine 2 is eliminated, and the amount of energy of the flying machine 2 can be saved by causing the ground-moving machine 1 to move with the flying machine 2 landed thereon.

Embodiment 2

Next, a movement assistance system according to Embodiment 2 will be described with reference to FIGS. 7 and 8. In the present embodiment, the movement assistance system includes a travel instruction device 3 in addition to the ground-moving machine 1 and flying machine 2. In the present embodiment, the travel instruction device 3 is a mobile information terminal device.

In the present embodiment, the movement route of the ground-moving machine 1 is set through an operation performed on the travel instruction device 3 by the user of the travel instruction device 3, unlike in Embodiment 1. The user of the travel instruction device 3 may be, for example, an operator remotely controlling the ground-moving machine 1. In the case where the ground-moving machine 1 is configured to accommodate an occupant, the user may be the occupant of the ground-moving machine 1.

Figure 7:
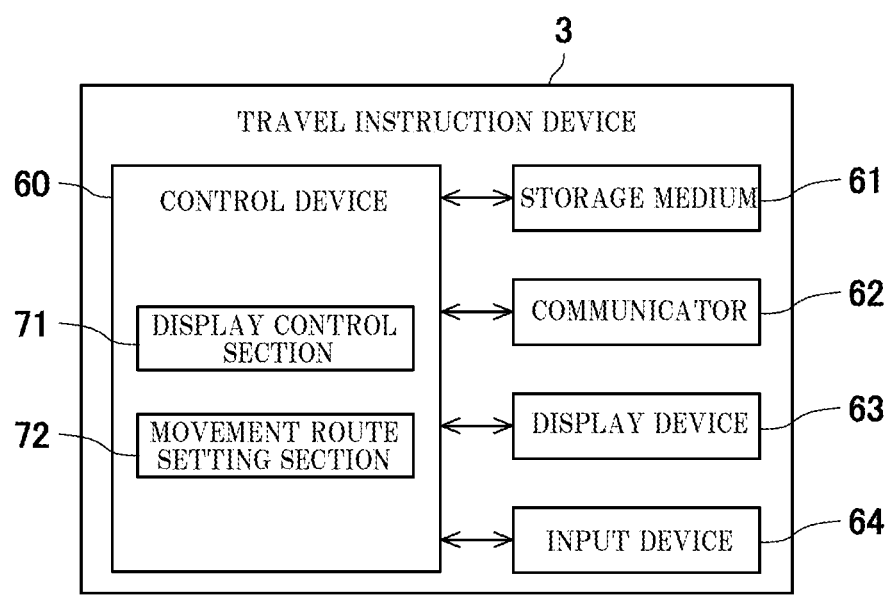
FIG. 7 is a block diagram showing the configuration of a travel instruction device of a movement assistance system according to Embodiment 2.

FIG. 7 is a block diagram showing the configuration of the travel instruction device 3. The travel instruction device 3 includes a control device 60, a storage medium 61, a communicator 62, a display device 63, and an input device 64. The elements 60 to 64 are connected together to enable data transfer therebetween.

The control device 60 executes various programs. The control device 60 is, for example, a CPU (central processing unit). The storage medium 61 stores various programs and data. The storage medium 61 is, for example, a non-volatile memory such as a ROM or a volatile memory such as a RAM. The communicator 62 is a transmitter-receiver that transmits and receives signals and information to and from the communicator 12 included in the ground-moving machine 1. The display device 63 displays an image viewable by the user. The input device 64 receives operation inputs from the user. The display device 63 and input device 64 may be integrally constructed as a touch screen.

The control device 60 includes a display control section 71 and a movement route setting section 72 as functional elements. The control device 60 executes a specified program stored in the storage medium 61 to implement the functions of the functional sections 71 and 72.

The display control section 71 causes the display device 63 to display the output section 44's output result sent from the ground-moving machine 1. The movement route setting section 72 sets the movement route of the ground-moving machine 1 based on an operation performed on the input device 64 by the user. Specifically, in the present embodiment, the output section 44 of the ground-moving machine 1 outputs information related to the movement-permitted zone and movement-prohibited zone to the travel instruction device 3 through the communicator 12, instead of outputting to the movement control section 45 any information related to the movement route of the ground-moving machine 1 which leads from the present location to the destination without passing through the movement-prohibited zone.

Figure 8:
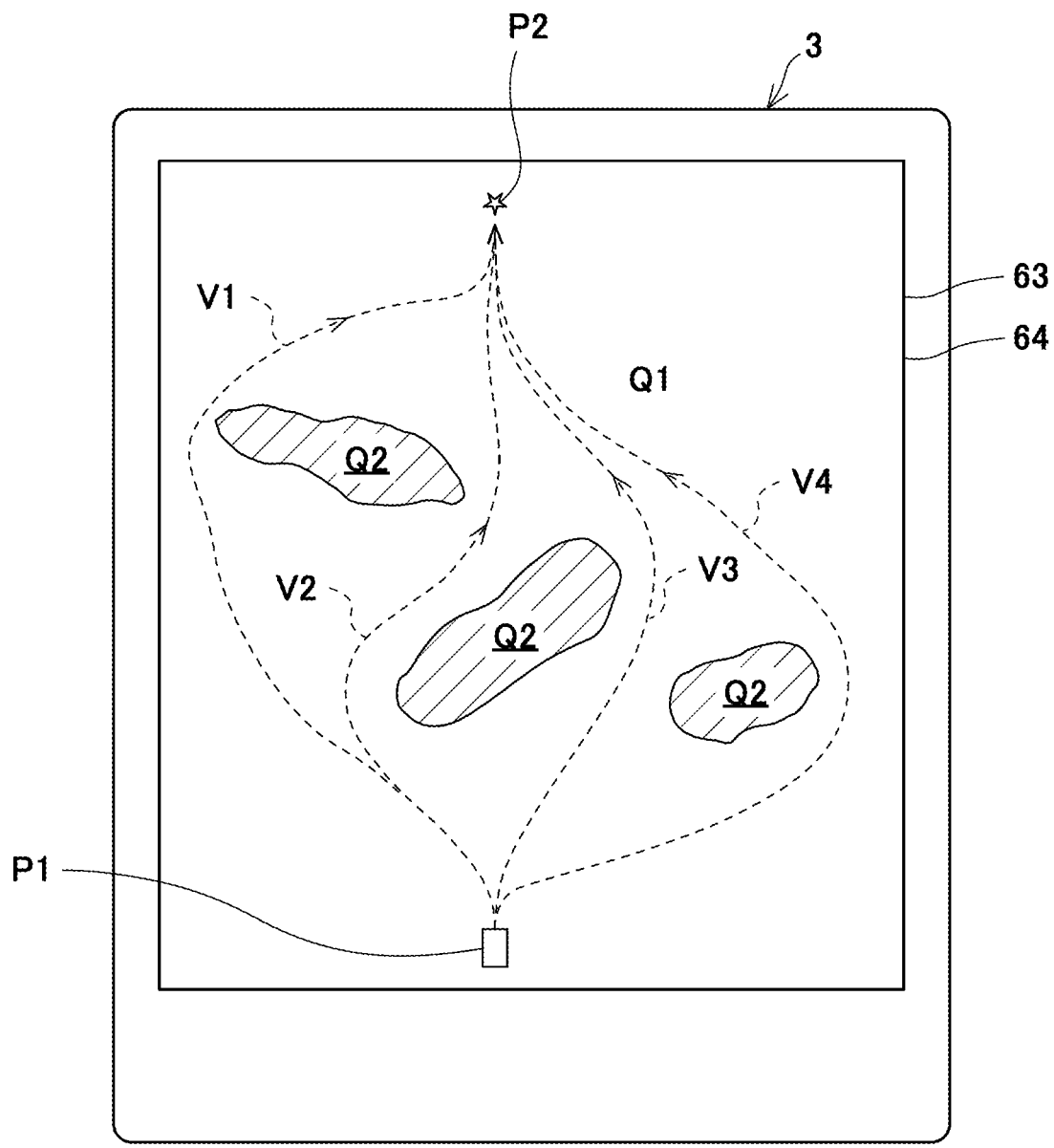
FIG. 8 is a diagram showing an example of an image displayed on the travel instruction device shown in FIG. 7.

FIG. 8 is a diagram showing an example of an image displayed on the display device 63 of the travel instruction device 3. The display control section 71 displays, on a display screen, a ground image schematically representing the ground surface lying between the present location P1 and the destination P2. Based on the output section 44's output result received from the ground-moving machine 1, the display control section 71 displays the ground surface lying between the present location P1 and the destination P2 in such a manner as to allow the user to distinguish between a movement-permitted zone Q1 and movement-prohibited zones Q2.

Further, the movement route setting section 72 calculates candidate routes V1 to V4 not passing through the movement-prohibited zones Q2 as candidates for the route of movement of the ground-moving machine 1 from the present location P1 to the destination P2. The display control section 71 presents the candidate routes V1 to V4 on the display screen. Once one of the candidate routes V1 to V4 is selected by the user through an operation on the input device 64, the movement route setting section 72 sends information related to the selected candidate route (movement route information) to the ground-moving machine 1 through the communicator 62. In the ground-moving machine 1, the movement control section 45 controls the movement device 13 based on the received movement route information to move the ground-moving machine 1.

In the present embodiment, the movement route setting section 72 need not necessarily calculate the candidate routes V1 to V4. For example, a movement route leading from the present location P1 to the destination P2 without passing through the movement-prohibited zones Q2 may be freely set by the user through an operation on the input device 64. In this case, the movement route setting section 72 sends information related to the movement route set by the user (movement route information) to the ground-moving machine 1 through the communicator 62.

The present embodiment can provide the same effects as Embodiment 1. Further, in the present embodiment, the output section 44 causes the display device 63 to display a synthetic image in which at least one selected from the movement route of the ground-moving machine 1 which leads to the destination P2 without passing through the movement-prohibited zone, the movement-permitted zone, and the movement-prohibited zone is superimposed on the ground image representing the ground lying between the present location P1 and the destination P2. As such, for example, information useful for moving the ground-moving machine 1 to the destination P2 can be presented to an operator remotely controlling the ground-moving machine 1 or an occupant such as a driver on board the ground-moving machine 1. The operator or driver can confirm the zone classification result on the display screen to set a route best suited for movement of the ground-moving machine 1 to the destination P2.

OTHER EMBODIMENTS

The present invention is not limited to the embodiments described above, and various modifications can be made without departing from the gist of the present invention.

For example, the zone classification section 43, first energy estimation section 41$a$, and flight prohibition section 41$b$ need not be included in the control device 10 of the ground-moving machine 1 and may be included in another control device (e.g., the control device 20 of the flying machine 2 or the control device 60 of the travel instruction device 3). The terrain information acquisition instruction section 52, second energy estimation section 53$c$, and return decision section 53$d$ need not be included in the control device 20 of the flying machine 2 and may be included in another control device (e.g., the control device 10 of the ground-moving machine 1 or the control device 60 of the travel instruction device 3). The movement assistance system of the present invention may not include one, some, or all of the flight instruction section 41, nearby area information acquisition section 42, first energy estimation section 41$a$, flight prohibition section 41$b$, residual energy monitoring section 53$a$, energy consumption monitoring section 53$b$, second energy estimation section 53$c$, and return decision section 53$d$.

While in the above embodiments the flight route of the flying machine 2 is determined by the flight instruction section 41 based on location information indicating the present location P1 of the ground-moving machine 1 and location information indicating the destination P2, the flight route may be determined irrespective of the destination of the ground-moving machine 1, or the flight route information may be received through the communicator 22. For example, the flight route of the flying machine 2 may be set to follow a trajectory predetermined with respect to the ground-moving machine 1 on a certain area in a midair space ahead of the ground-moving machine 1.

While in the above embodiments the destination P2 of the ground-moving machine 1 is set before takeoff of the flying machine 2, the destination of the ground-moving machine 1 may be set after takeoff of the flying machine 2. The destination of the ground-moving machine 1 may be determined by the user or the control device 10 of the ground-moving machine 1 based on the terrain information acquired by the flying machine 2 during flight.

The takeoff-landing platform serving as the takeoff-landing site for the flying machine may be provided in an installation other than the ground-moving machine 1. In this case, the ground-moving machine 1 need not have a structure required to enable takeoff and landing of the flying machine 2, and thus size increase of the ground-moving machine 1 can be prevented.

While in the above embodiments the terrain information and the location information of the flying machine 2 are sent to the ground-moving machine 1 after the flying machine 2 returns to the ground-moving machine 1, the terrain information and the location information of the flying machine 2 may be sent to the ground-moving machine 1 as needed during flight of the flying machine 2.

Figure 9:
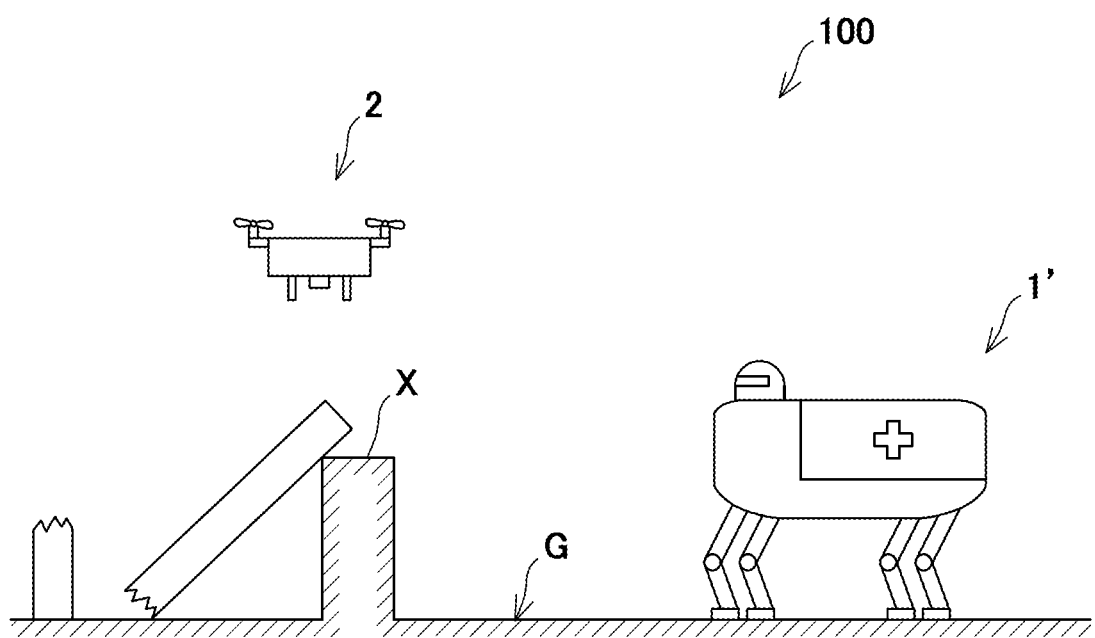
FIG. 9 is a schematic configuration diagram of a movement assistance system according to a modified example.

The present invention is useful particularly for assisting the movement of an unmanned disaster response robot 1' as shown in FIG. 9 which is configured to perform rescue activities or collect information on sites such as a disaster site. In FIG. 9, a legged moving machine including a plurality of legs contacting the ground is shown as an example of the disaster response robot 1'. Such robots as the disaster response robot 1' which have been developed thus far are constructed to move across obstacles such as debris of concrete or wood. However, the disaster response robot 1' has limited capacity to move across obstacles. If the present invention is applied to the disaster response robot 1' as a ground-moving machine, the disaster response robot 1' can know the location of an obstacle before encountering the obstacle and take a route avoiding the obstacle. Thus, the disaster response robot 1' can be moved quickly to a specified location on a disaster site.

The present invention is applicable also to assistance for the movement of an off-road vehicle such as a utility vehicle. High-speed travel by such off-road vehicles on wildlands without roads has traditionally been done for enjoyment. The present invention allows the driver of an off-road vehicle as a ground-moving machine to travel without concerning about extremely steep slopes or obstacles. The moving machine of the present invention may be any of manned, unmanned, or self-driving vehicles.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. A storage device storing a movement assistance program executed in a system including a ground-moving machine configured to move on ground and a flying machine in order to assist movement of the ground-moving machine to a specified destination location, the program being configured to cause a computer to implement the functions of:
    a flight instruction section that determines a flight route of the flying machine based on location information indicating a present location of the ground-moving machine and location information indicating the destination location;
    a terrain information acquisition instruction section that instructs a terrain information acquisition device mounted on the flying machine to acquire terrain information representing a terrain lying between the present location of the ground-moving machine and the destination location during a flight of the flying machine along the determined flight route;
    a zone classification section that estimates a degree of elevation change at elevated portions of different sites on the terrain represented by the terrain information between the present location and the destination location, and that makes a classification based on a predetermined movement permission condition and the terrain information acquired by the terrain information acquisition device to divide the terrain lying between the present location and the destination location into a movement-permitted zone meeting the predetermined movement permission condition and a movement-prohibited zone failing to meet the predetermined movement permission condition, the predetermined movement permission condition including a condition for determining whether the estimated degree of elevation change at the elevated portions is within a specified range over which the ground-moving machine is permitted to cross or climb the elevated portions in view of a capacity of the ground-moving machine; and
    an output section that outputs at least one selected from a movement route of the ground-moving machine, the movement-permitted zone, and the movement-prohibited zone, the movement route leading from the present location to the destination location without passing through the movement-prohibited zone, wherein
    the terrain information acquisition device is a distance meter mounted on the flying machine; and
    the elevation is calculated based on a distance from the flying machine to the terrain as detected by the distance meter.

2. The storage device according to claim 1, wherein
    based on a result of the classification by the zone classification section, the output section determines and outputs the movement route leading to the destination location without passing through the movement-prohibited zone, and
    the program causes the computer to further implement the function of a movement control section that controls movement of the ground-moving machine based on the outputted movement route.

3. The storage device according to claim 1, wherein the output section causes a display device to display a synthetic image in which at least one selected from the movement route leading to the destination location without passing through the movement-prohibited zone, the movement-permitted zone, and the movement-prohibited zone is superimposed on a ground image representing ground lying between the present location and the destination location.

4. The storage device according to claim 1, wherein
    the flying machine includes a propulsion force generation device and an energy source for the propulsion force generation device, and
    the program causes the computer to further implement the functions of:
    a flight control section that controls flight of the flying machine such that the flying machine flies at least between the present location of the ground-moving machine and the specified destination location;
    a residual energy monitoring section that monitors a residual energy of the energy source;
    an energy estimation section that estimates an amount of energy required for the flying machine to make outward and return flights along the determined flight route connecting a specified takeoff-landing site for the flying machine to the destination location; and
    a flight prohibition section that prohibits the flying machine from flying from the takeoff-landing site toward the destination location when the estimated amount of energy is more than the residual energy.

5. The storage device according to claim 4, wherein the estimated amount of energy is a value obtained by adding the amount of takeoff-landing energy required for takeoff and landing of the flying machine to the amount of flight energy required for flight along the flight route and calculated from a distance of the flight along the flight route.

6. The storage device according to claim 4, wherein the program causes the computer to further implement the functions of:
    an energy consumption monitoring section that monitors an energy consumption which is the amount of energy consumed by the flying machine from when the flying machine departs from the takeoff-landing site until the flying machine reaches a point on the flight route toward the destination location; and
    a return decision section that decides, based on the energy consumption and the residual energy, whether to cause the flying machine to return to the takeoff-landing site.

7. The storage device according to claim 4, wherein a takeoff-landing platform serving as the takeoff-landing site for the flying machine is provided in the ground-moving machine or an installation other than the ground-moving machine.

8. A movement assistance system comprising a ground-moving machine configured to move on ground and a flying machine, the movement assistance system being configured to assist movement of the ground-moving machine to a specified destination location, wherein
the flying machine comprises a terrain information acquisition device and a terrain information acquisition instruction section that instructs the terrain information acquisition device to acquire terrain information representing a terrain lying between a present location of the ground-moving machine and the destination location,
the ground-moving machine or the flying machine comprises a zone classification section that estimates a degree of elevation change at elevated portions of different sites on the terrain represented by the terrain information between the present location and the destination location, and that makes a classification based on a predetermined movement permission condition and the terrain information to divide the terrain lying between the present location and the destination location into a movement-permitted zone meeting the predetermined movement permission condition and a movement-prohibited zone failing to meet the predetermined movement permission condition, the predetermined movement permission condition including a condition for determining whether the estimated degree of elevation change at the elevated portions is within a specified range over which the ground-moving machine is permitted to cross or climb the elevated portions in view of a capacity of the ground-moving machine,
the ground-moving machine comprises an output section that outputs at least one selected from a movement route of the ground-moving machine, the movement-permitted zone, and the movement-prohibited zone, the movement route leading from the present location to the destination location without passing through the movement-prohibited zone, and
the ground-moving machine or the flying machine determines a flight route of the flying machine based on location information indicating the present location of the ground-moving machine and location information indicating the destination location, wherein
the terrain information acquisition device is a distance meter mounted on the flying machine; and
the elevation is calculated based on a distance from the flying machine to the terrain as detected by the distance meter.

9. A movement assistance method executed in a system including a ground-moving machine configured to move on ground and a flying machine in order to assist movement of the ground-moving machine to a specified destination location, the method comprising:

instructing a terrain information acquisition device mounted on the flying machine to acquire terrain information representing a terrain lying between a present location of the ground-moving machine and the destination location;
estimating a degree of elevation change at elevated portions of different sites on the terrain represented by the terrain information between the present location and the destination location;
making a classification based on a predetermined movement permission condition and the terrain information to divide the terrain lying between the present location and the destination location into a movement-permitted zone meeting the predetermined movement permission condition and a movement-prohibited zone failing to meet the predetermined movement permission condition, the predetermined movement permission condition including a condition for determining whether the estimated degree of elevation change at the elevated portions is within a specified range over which the ground-moving machine is permitted to cross or climb the elevated portions in view of a capacity of the ground-moving machine; and
outputting at least one selected from a movement route of the ground-moving machine, the movement-permitted zone, and the movement-prohibited zone, the movement route leading from the present location to the destination location without passing through the movement-prohibited zone, wherein
the method further comprises determining a flight route of the flying machine based on location information indicating the present location of the ground-moving machine and location information indicating the destination location before instructing the terrain information acquisition device to acquire the terrain information, wherein
the terrain information acquisition device is a distance meter mounted on the flying machine; and
the elevation is calculated based on a distance from the flying machine to the terrain as detected by the distance meter.

10. The storage device according to claim 1, wherein the program is configured to cause the computer to determine a route connecting the present location to the destination location as the flight route along which the flying machine makes outward and return flights.

11. The storage device according to claim 1, wherein the program is configured to cause the computer to determine a route corresponding to a straight line drawn between the present location and the destination location as the flight route along which the flying machine makes outward and return flights.

12. The storage device according to claim 1, wherein the ground-moving machine is a legged moving machine including a plurality of legs configured to contact the ground.

* * * * *